(12) United States Patent
Nishino et al.

(10) Patent No.: US 10,670,171 B2
(45) Date of Patent: Jun. 2, 2020

(54) WIRING INCORPORATED RESIN PIPE AND METHOD OF MANUFACTURING THE SAME

(71) Applicant: Panasonic Intellectual Property Management Co., Ltd., Osaka (JP)

(72) Inventors: Shouma Nishino, Osaka (JP); Takashi Morimoto, Osaka (JP); Hideo Mine, Nara (JP); Masashi Tanaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 15/713,602

(22) Filed: Sep. 22, 2017

(65) Prior Publication Data

US 2018/0119848 A1 May 3, 2018

(30) Foreign Application Priority Data

Oct. 28, 2016 (JP) ................................. 2016-211164

(51) Int. Cl.
*F16L 9/00* (2006.01)
*A47L 9/24* (2006.01)
(Continued)

(52) U.S. Cl.
CPC ............... *F16L 9/006* (2013.01); *A47L 9/248* (2013.01); *B29C 45/14475* (2013.01);
(Continued)

(58) Field of Classification Search
CPC . F16L 9/006; F16L 9/125; F16L 47/03; F16L 9/12; F16L 11/005; A47L 9/248; A47L 9/24; B29C 45/14475; B29C 45/14598; B29C 70/326; B29C 70/72; B29C 70/74; B29C 45/14065; B29C 45/14418; B29C 45/14467; B29C 45/14639; B29C 45/261; H02G 3/04;
(Continued)

(56) References Cited

U.S. PATENT DOCUMENTS 6,007,522 A 12/1999 Agro et al.
2004/0235364 A1 11/2004 Matsumoto et al.
(Continued)

FOREIGN PATENT DOCUMENTS

CN 105620387 * 6/2016
JP 63-126482 8/1988
(Continued)

*Primary Examiner* — Robert T Scruggs
(74) *Attorney, Agent, or Firm* — Wenderoth, Lind & Ponack, L.L.P.

(57) ABSTRACT

A wiring incorporated resin pipe includes a tubular shaped sheet formed in an approximately tubular shape at an interval so that a slit is formed between both ends in a transverse direction, a wiring unit arranged in the tubular shaped sheet along a longitudinal direction of the slit in an inner side of the slit and a resin material filled in a gap formed by matching surfaces of the slit of the tubular shaped sheet and the wiring unit to thereby seal the matching surfaces of the slit of the tubular shape sheet, in which conductive wires for wiring are laid inside the wiring unit in the longitudinal direction.

12 Claims, 13 Drawing Sheets

(51) Int. Cl.
*B29C 70/72* (2006.01)
*H02G 3/04* (2006.01)
*B29C 45/14* (2006.01)
*B29C 70/74* (2006.01)
*B29C 70/32* (2006.01)
*B32B 1/08* (2006.01)
*F16L 9/12* (2006.01)
*F16L 11/00* (2006.01)
*F16L 47/03* (2006.01)
*B29L 31/34* (2006.01)
*B29C 45/26* (2006.01)
*B29K 101/10* (2006.01)
*B29L 23/00* (2006.01)

(52) U.S. Cl.
CPC ...... *B29C 45/14598* (2013.01); *B29C 70/326* (2013.01); *B29C 70/72* (2013.01); *B29C 70/74* (2013.01); *B32B 1/08* (2013.01); *F16L 9/12* (2013.01); *F16L 11/005* (2013.01); *H02G 3/04* (2013.01); *H02G 3/0462* (2013.01); *B29C 45/14065* (2013.01); *B29C 45/14418* (2013.01); *B29C 45/14467* (2013.01); *B29C 45/14639* (2013.01); *B29C 45/261* (2013.01); *B29K 2101/10* (2013.01); *B29L 2023/22* (2013.01); *B29L 2031/34* (2013.01); *B32B 2274/00* (2013.01); *B32B 2597/00* (2013.01); *F16L 9/125* (2013.01); *F16L 47/03* (2013.01)

(58) Field of Classification Search
CPC .............. H02G 3/0462; B29K 2101/10; B29L 2023/22; B29L 2031/34; B32B 2274/00; B32B 2597/00; B32B 1/08
USPC ..... 174/68.1, 68.3, 70 C, 77 R, 47; 138/151, 138/156
See application file for complete search history.

(56) References Cited

U.S. PATENT DOCUMENTS

| 2005/0098342 | A1* | 5/2005 | Sakabe | G02B 6/4461 174/102 R |
| 2005/0177043 | A1 | 8/2005 | Windheuser et al. | |
| 2008/0301903 | A1* | 12/2008 | Cunningham | A47L 9/281 15/410 |
| 2014/0230238 | A1* | 8/2014 | Ueno | H01F 37/00 29/602.1 |
| 2016/0368436 | A1* | 12/2016 | Wakabayashi | B60R 16/0215 |

FOREIGN PATENT DOCUMENTS

| JP | 6-341587 | 12/1994 |
| JP | 2001-511023 | 8/2001 |
| JP | 2004-349026 | 12/2004 |
| JP | 2015-84627 | 4/2015 |
| WO | 2013/065183 | 5/2013 |

* cited by examiner

FIG. 13
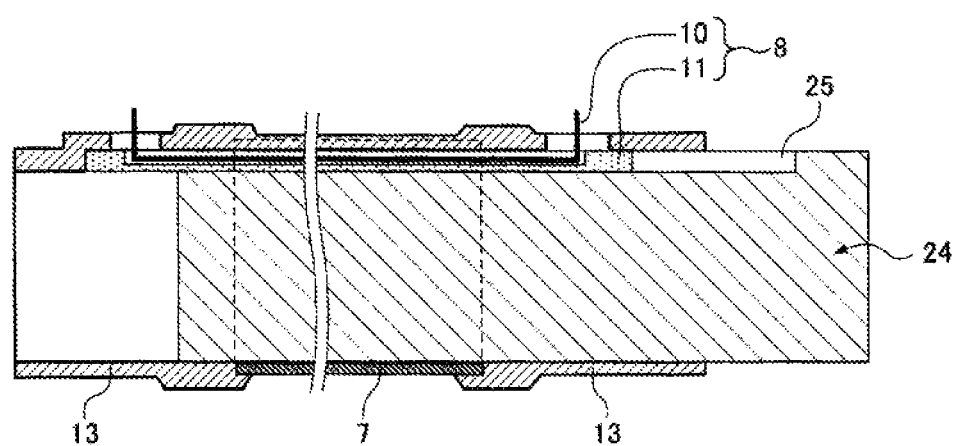
FIG. 14A
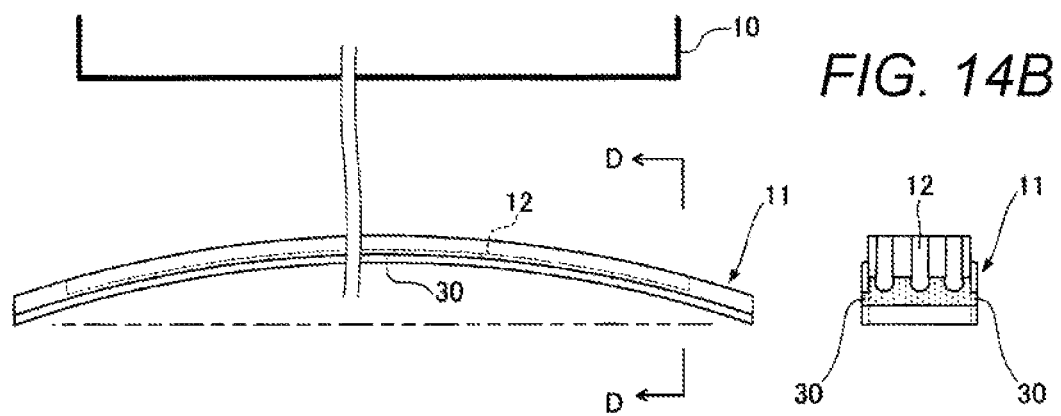
FIG. 14B

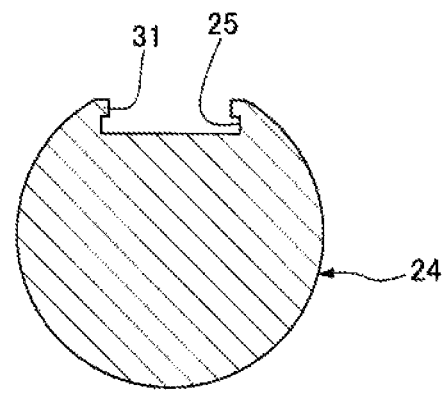
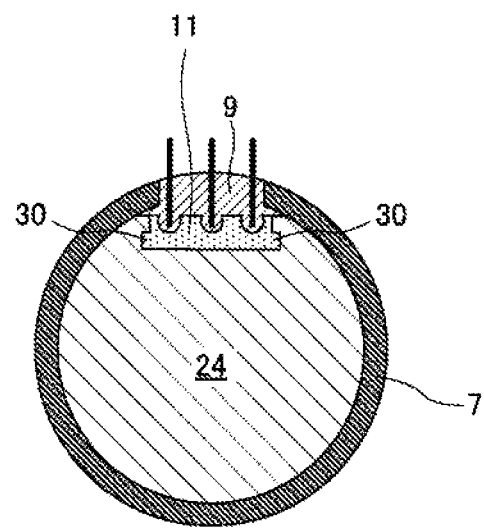

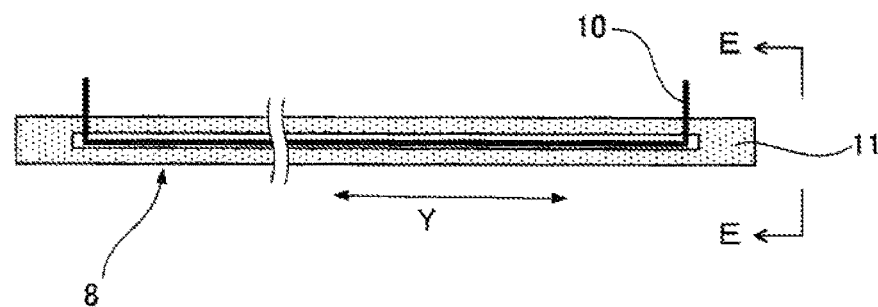
FIG. 22A
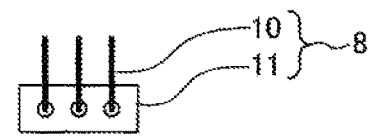
FIG. 22B
FIG. 23
PRIOR ART
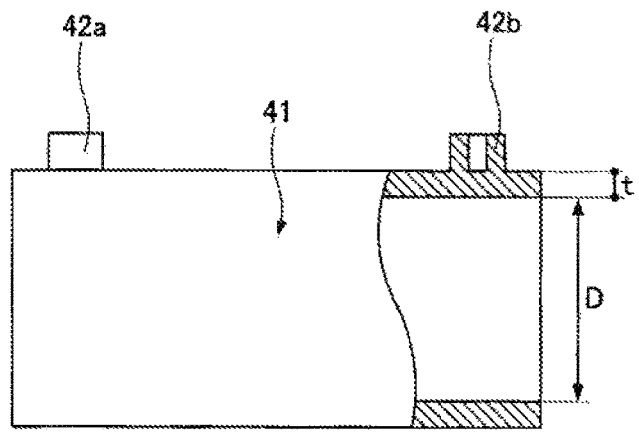
FIG. 24
PRIOR ART
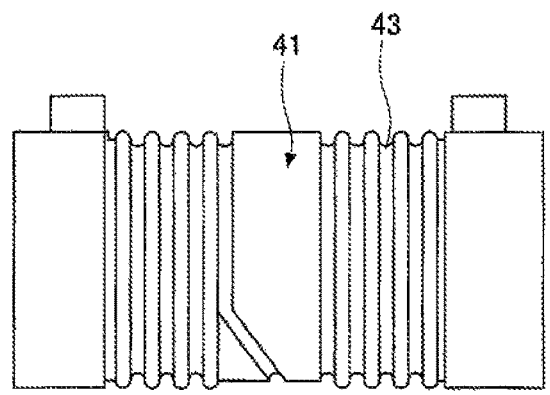

WIRING INCORPORATED RESIN PIPE AND METHOD OF MANUFACTURING THE SAME

TECHNICAL FIELD

The technical field relates to a wiring incorporated resin pipe in which conductive wires for electric wiring are laid to be incorporated therein.

BACKGROUND

A wiring incorporated resin pipe is generally formed by being molded, for example by, injection molding, extrusion molding and so on, to obtain a target diameter and length. As a method of coating a conductive wire for electric wiring, for example, the conductive wire is inserted into a crosshead at an end of an extrusion molding machine, thereby performing extrusion molding while coating a periphery of the conductive wire with a coating resin.

When the wiring incorporated resin pipe is molded by extrusion molding by combining these related art techniques, it is easy to imagine that a resin pipe with a conductive wire arranged inside the pipe can be manufactured by inserting the conductive wire into the crosshead at the end.

However, in the wiring incorporated resin pipe manufactured by the method of the above combination, wiring inside the resin pipe is also cut at the same time when the resin pipe is cut into an arbitrary length, an end surface of the resin pipe and an end surface of wiring are disposed side by side on the same plane, therefore, creating problems such as extreme difficulty in performing electrical connections to the outside and to add and or connect terminals.

In view of the above problems, a method described in JP-A-H6-341587 (Patent Literature 1) was developed. FIG. 23 and FIG. 24 show a method of incorporating wiring into a pipe described in Patent Literature 1.

FIG. 23 shows an inner tube member 41 for a nominal diameter (inner diameter of a tube) 200 mm before groove processing, which is an almost cylindrical shape with an inner diameter D is approximately 218 mm and a wall thickness "t" is 5 mm. Pedestals 42a and 42b to which connector pins are attached are provided on outer surfaces of both ends, which are formed of a thermoplastic resin such as polyethylene.

Spiral-shaped grooves 43 shown in FIG. 24 are machined with respect to the inner tube member 41. Then, a heating wire is wound in the grooves 43 and connector pins are connected to be attached to the pedestals 42a and 42b. Separately, an outer tube member is integrally formed by injection molding to complete an electric fusion type plastic tube joint.

SUMMARY

In the related-art structure, it is necessary to wind the conductive wire around the grooves after the groove processing is performed to the entire circumference of the pipe in accordance with a distance between connector pins in which wiring is necessary. It is also necessary to mold the outer tube enough to cover the wiring in accordance with the necessary distance after the wiring is wound around the inner tube in which the grooves are processed. Accordingly, there are problems such as final thickness and weight of the pipe are increased, manufacturing time until completion of the pipe is increased, and thus productivity is drastically decreased.

The present disclosure has been made for solving the above related-art problems and an object thereof is to provide a wiring incorporated resin pipe that is both light in weight and more quickly manufactured.

A wiring incorporated resin pipe according to the present disclosure includes a tubular shaped sheet formed in an approximately tubular shape at an interval so a slit is formed between both ends in a transverse direction, a wiring unit arranged in the tubular shaped sheet along a longitudinal direction of the slit in an inner side of the slit and a resin material filled in a gap formed by a matching surface of the slit of the tubular shaped sheet and the wiring unit to thereby seal the matching surface of the slit of the tubular shape sheet, in which conductive wires for wiring are laid inside the wiring unit in the longitudinal direction.

A method of manufacturing a wiring incorporated resin pipe comprising the steps of arranging a thermoplastic sheet having a rectangular shape to be in an approximately tubular shape at an interval so that a slit is formed between both ends in a transverse direction, arranging a wiring unit in which conductive wires for wiring are laid in a longitudinal direction in the thermoplastic sheet in an inner side of the slit along the longitudinal direction of the slit and filling a resin material in a gap formed by a matching surfaces of the slit of the thermoplastic sheet and the wiring unit to integrate the thermoplastic sheet with the wiring unit.

Concerning the thickness and weight of the pipe in the wiring incorporated resin pipe having the above structure, increase of thickness due to coating of an outer periphery does not occur, therefore, the pipe can be molded with a target sheet thickness from the beginning, and an extremely light weight pipe can be obtained.

Furthermore, it is not necessary to wind conductive wires over the periphery over the entire distance which requires wiring, and a coating process of conductive wires after the winding is not necessary, therefore, a running time until completion of a product can be reduced.

According to the above structure, a resin pipe with a light weight due to use of the thermoplastic multilayer fiber reinforced sheet and with incorporated wiring can be provided at low costs due to high productivity and high yield.

BRIEF DESCRIPTION OF THE DRAWINGS

FIG. 13 is a view for explaining a state where the core bar is pulled out from a molded product;

FIG. 14A is an exploded view of a wiring unit used for a wiring incorporated resin pipe according to Embodiment 2 of the present disclosure and FIG. 14B is a cross-sectional view of a holder taken along D-D of FIG. 14A;

FIG. 15 is a cross-sectional view of a relevant part of a core bar of an injection molding device used in the same embodiment;

FIG. 16 is a cross-sectional view in a state where the wiring unit is set in a concave part in the core bar, a resin material is injected and before the core bar is pulled out from a molded product in the same embodiment;

FIG. 22A is a cross-sectional view of a wiring unit and FIG. 22B is an arrow view showing taken along E-E of FIG. 22A according to Embodiment 5 of the present disclosure;

FIG. 23 is a view showing an inner tube member of a wiring incorporated resin pipe described in Patent Literature 1; and FIG. 24 is a view showing a groove shape provided in the inner tube member of the wiring incorporated resin pipe described in Patent Literature 1.

DESCRIPTION OF EMBODIMENTS

Hereinafter, embodiments of the present disclosure will be explained with reference to the drawings.

Embodiment 1

FIG. 1 to FIG. 13 show Embodiment 1 of the present disclosure.

Figure 4:
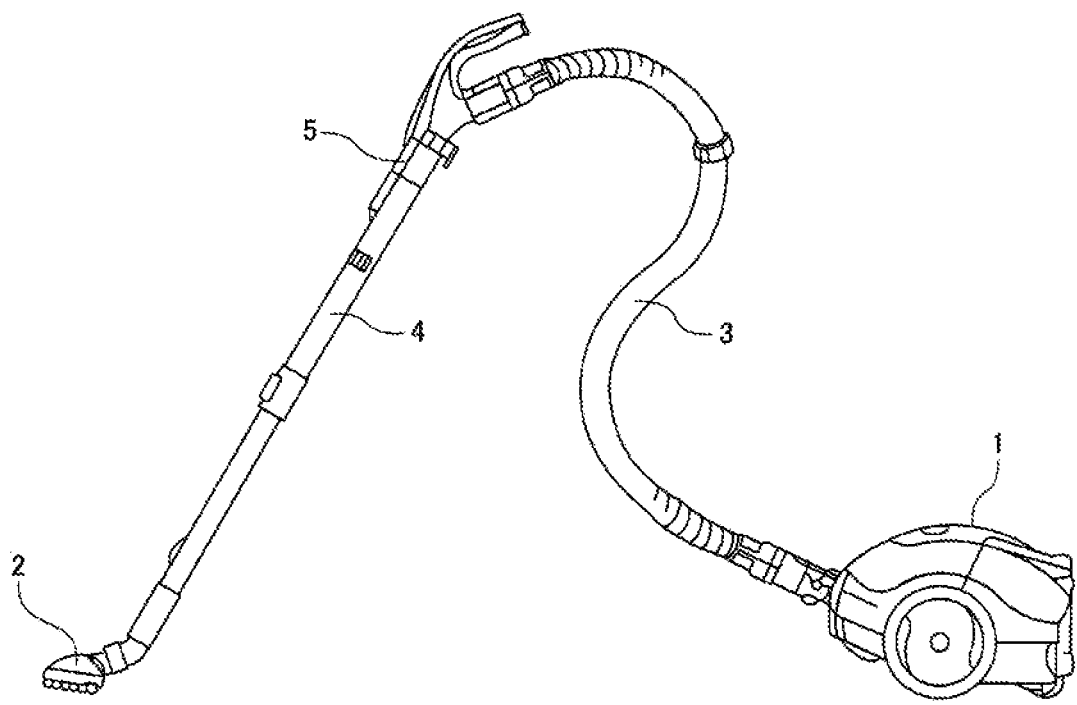
FIG. 4 is an external view of a vacuum cleaner.

A typical vacuum cleaner shown in FIG. 4 is provided with a motor for generating a force that sucks dust and dirt into a cleaner body 1. The cleaner body 1 and a suction nozzle 2 are connected through a flexible and hollow hose 3 and a wiring incorporated resin pipe 4. In a hand operation unit 5 provided at an end of the hose 3, switches and a display part for a power supply and various operations are arranged. For example, a motor of the suction nozzle 2 is energized through the wiring incorporated resin pipe 4, thereby rotating a brush.

Figure 1:
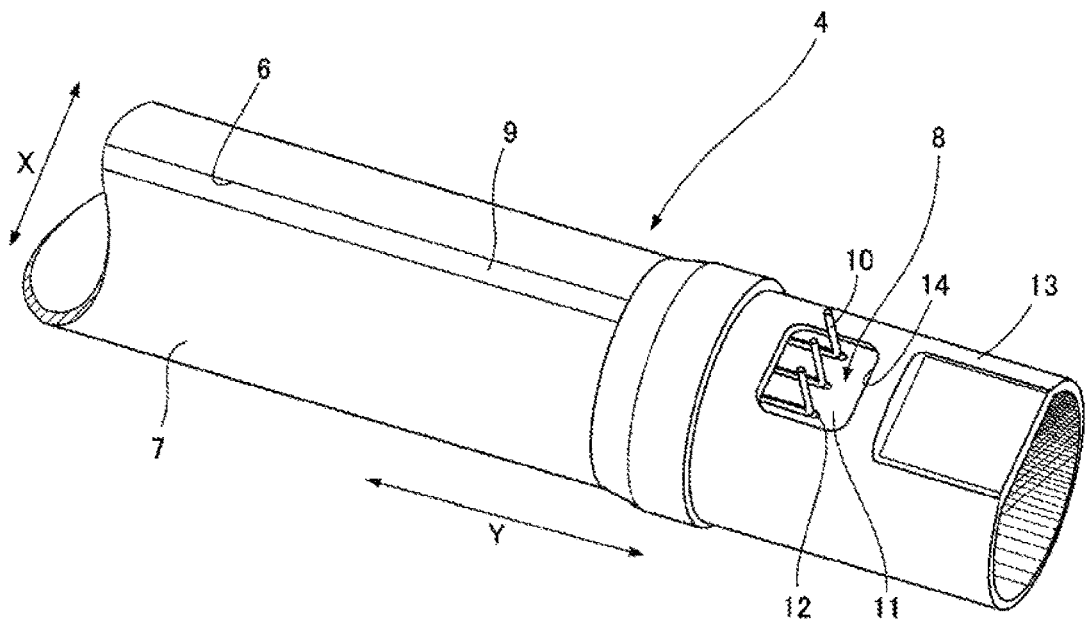
FIG. 1 is a perspective view showing an end portion of a wiring incorporated resin pipe according to Embodiment 1 of the present disclosure.
Figure 2A:
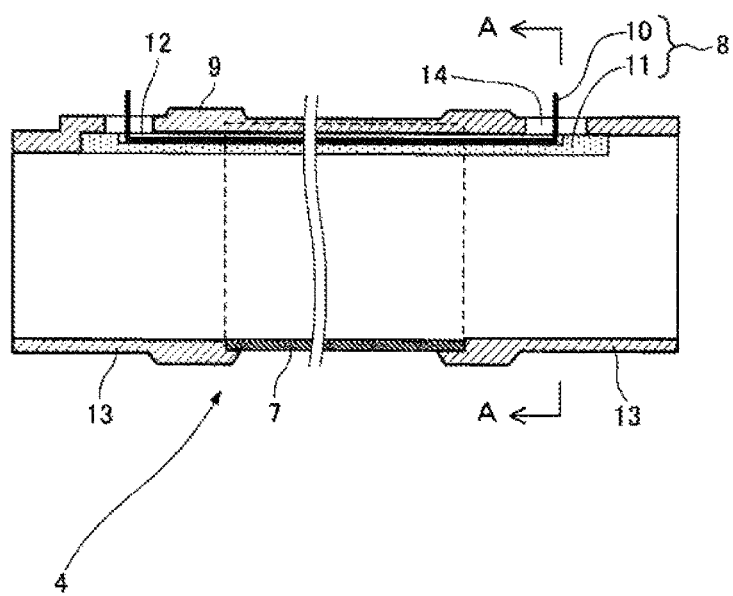
FIG. 2A is a cross-sectional view showing the wiring incorporated resin pipe in a longitudinal direction according to the same embodiment and FIG. 2B is a cross-sectional view taken along A-A of FIG. 2A.
Figure 2B:
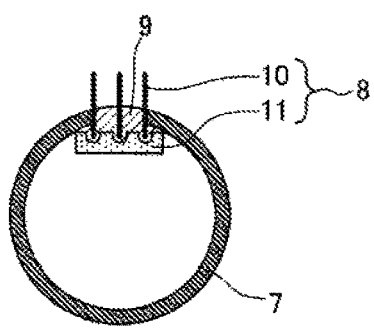
Figure 3A:
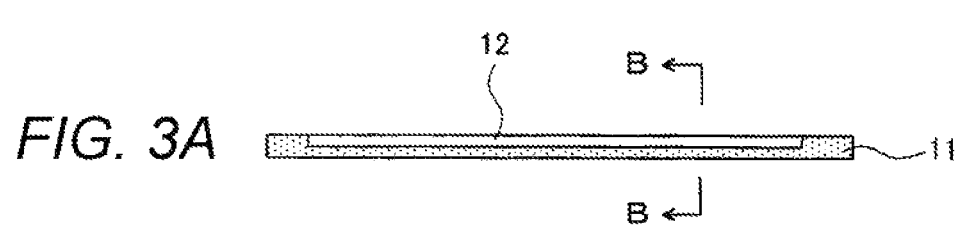
FIG. 3A is a cross-sectional view showing a holder in the longitudinal direction according to the same embodiment and FIG. 3B is a cross-sectional view taken along B-B of FIG. 3A.
Figure 3B:
Figure 5:
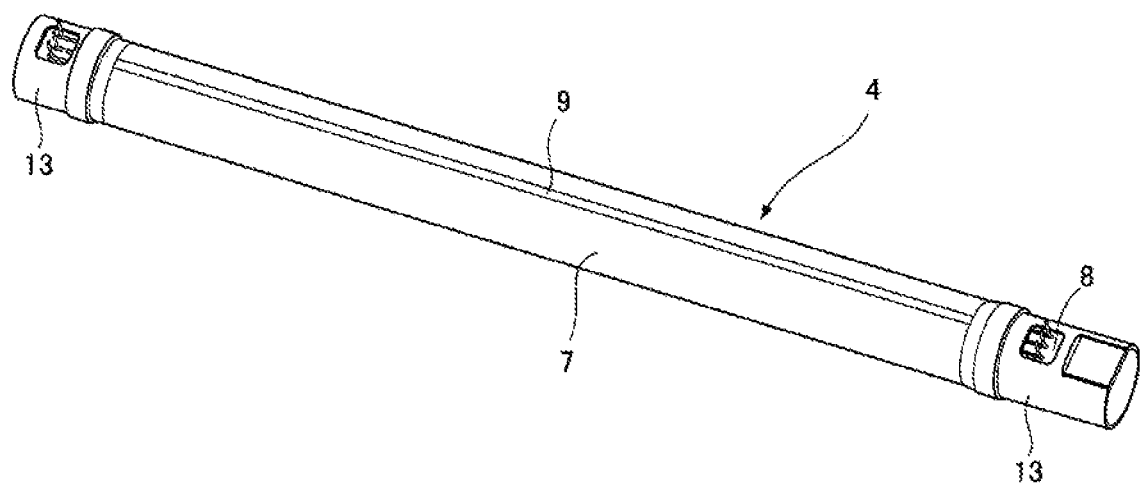
FIG. 5 is a perspective view of the wiring incorporated resin pipe according to the same embodiment.

FIG. 5 shows the wiring incorporated resin pipe 4. FIG. 1 is an enlarged view of one end of the wiring incorporated resin pipe 4. As shown in FIGS. 2A and 2B, the wiring incorporated resin pipe 4 includes a tubular shaped sheet 7 having a tubular shape at an interval so that slit 6 is formed between both ends in a transverse direction (an arrow X direction), a wiring unit 8 arranged along a longitudinal direction (an arrow Y direction) in an inner side of the silt 6 and a resin material 9 filled in a gap formed by a matching surfaces of the slit 6 of the tubular shaped sheet 7 and the wiring unit 8 to thereby seal the matching surfaces of the slit 6 in the tubular-shaped sheet 7, in which conductive wires 10 for wiring are laid in the wiring unit 8 in the longitudinal direction.

The tubular-shaped sheet 7 is a polyolefin-based thermoplastic multilayer fiber reinforced resin sheet with a fiber layer, which has a rectangular shape before molding. The wiring unit 8 is provided with a holder 11 shown in FIGS. 3A and 3B and grooves 12 formed in the holder 11 in parallel to one another in the longitudinal direction. The conductive wires 10 are inserted into the grooves 12. As a material for the holder 11, a polyolefin-based thermoplastic resin is used. The conductive wires 10 are drawn out to the outside of the holder 11 while both ends thereof are bent by 90 degrees. A length of the holder 11 in the longitudinal direction is longer than that of the tubular shaped sheet 7.

In a gap between the slit 6 formed so that long edges face each other in the transverse direction of the tubular shaped sheet 7 and the holder 11 of the wiring unit 8, the molten resin material 9 is filled by injection by an injection molding device. The resin material 9 is reduced in temperature and solidified, thereby integrating the tubular shaped sheet 7 with the wiring unit 8.

Connecting parts 13 having a prescribed shape are integrally molded by the resin material 9 at both end portions of the wiring incorporated resin pipe 4, that are, at both ends of the tubular shaped sheet 7 in the longitudinal direction. Parts of end portions in the holder 11 are exposed at windows 14 formed in the connecting parts 13, and ends of the conductive wires 10 are drawn to the outside from the windows 14 in the connecting parts 13.

When the molten resin material 9 is filled by the injection molding device, the resin material 9 is filled also in gaps of the grooves 12 in the holder 11 and solidified.

Figure 6:
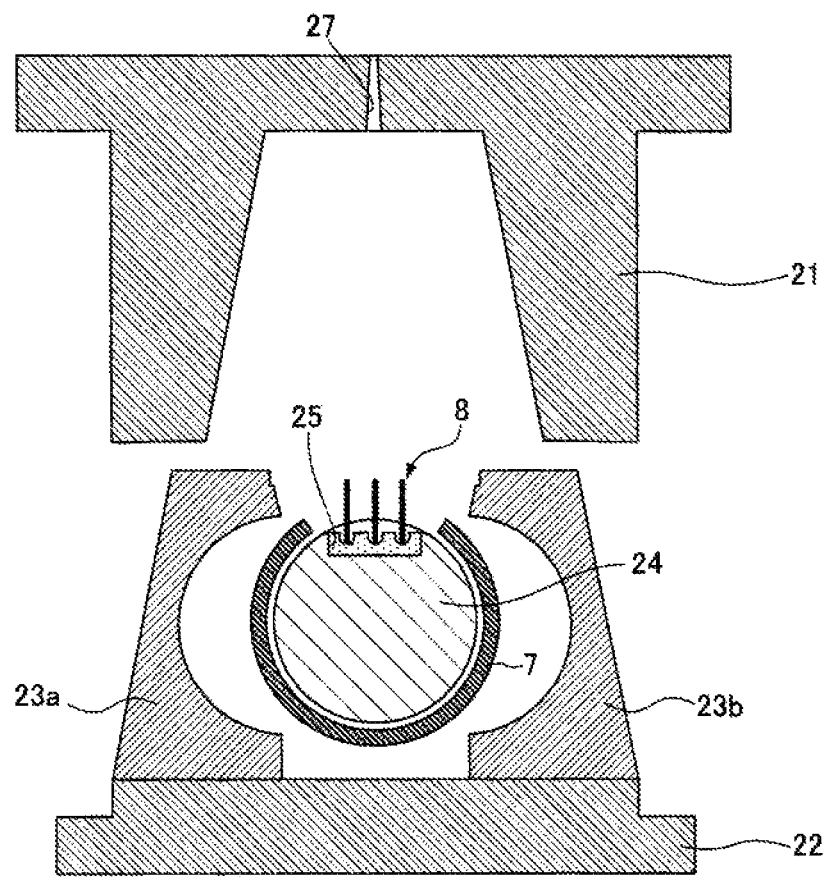
FIG. 6 is an explanatory view showing an injection molding device in a mold opening state, which is used for molding of the wiring incorporated resin pipe according to the same embodiment.
Figure 7:
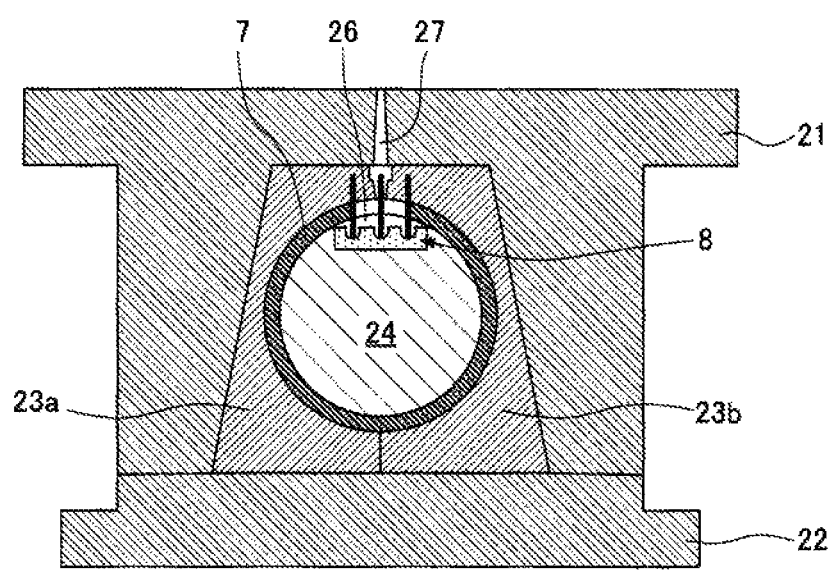
FIG. 7 is an explanatory view showing the injection molding device in a mold closed state, which is used for molding of the wiring incorporated resin pipe according to the same embodiment.
Figure 8A:
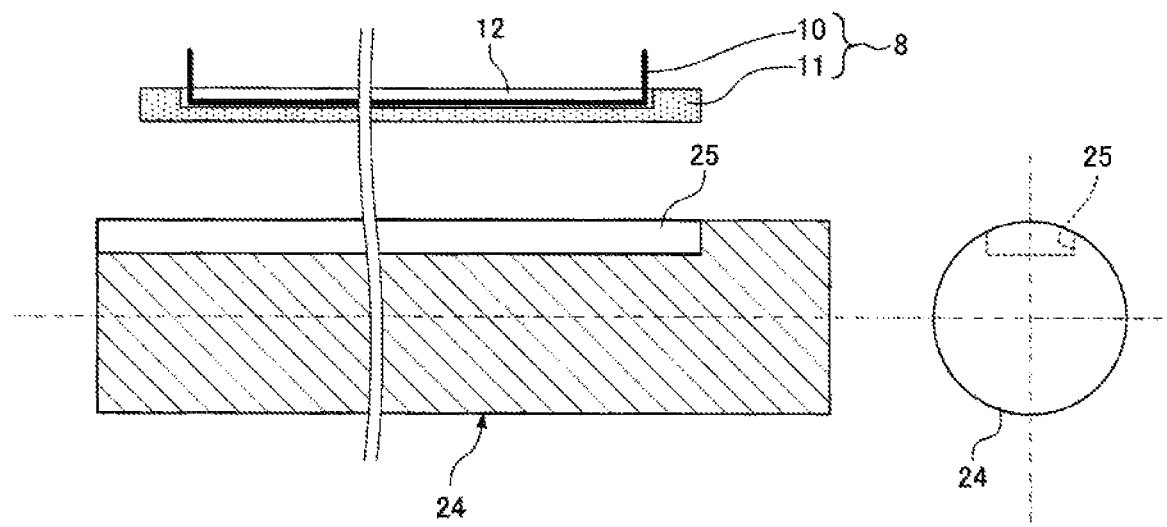
FIG. 8A shows a cross-sectional view just before a wiring unit is set in a core bar of the injection molding device and a side view of the core bar and FIG. 8B shows a cross-sectional view in a state where the wiring unit is set in the core bar and a cross sectional view taken along C-C of FIG. 8B.

FIG. 6 shows a mold opening state of the injection molding device and FIG. 7 shows a mold closed state. The injection molding device includes a movable-side first mold 21 and a fixed-side second mold 22. The second mold 22 includes slide cores 23a and 23b, a core bar 24 set inside the slide cores 23a and 23b and so on. In the core bar 24, a concave part 25 in which the holder 11 is set is formed on part of an upper surface as shown in FIG. 8A.

The wiring incorporated resin pipe 4 can be manufactured by the following processes.

Figure 8B:
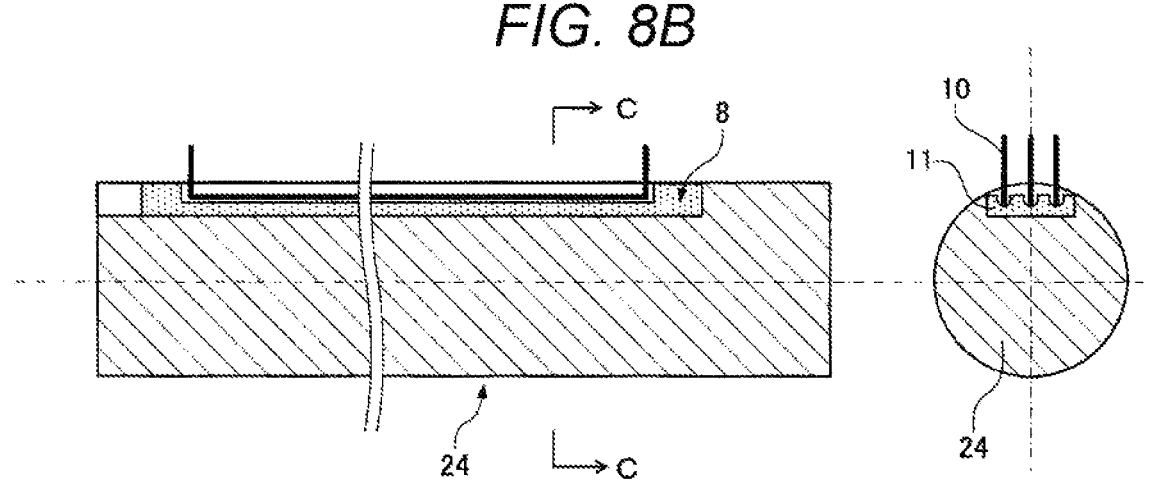

First, the wiring unit 8 in which the conductive wires 10 are set in the grooves 12 is set in the concave part 25 of the core bar 24 as shown in FIG. 8B. Furthermore, the tubular-shaped 7 is set on a peripheral surface of the core bar 24 so as to be an approximately tubular shape as shown in FIG. 6.

Through the tubular-shaped sheet 7 is wound after the wiring unit 8 is set in the core bar 24, it is the same when the wiring unit 8 is set after the tubular shaped sheet 7 is wound around the peripheral surface of the core bar 24.

Figure 9:
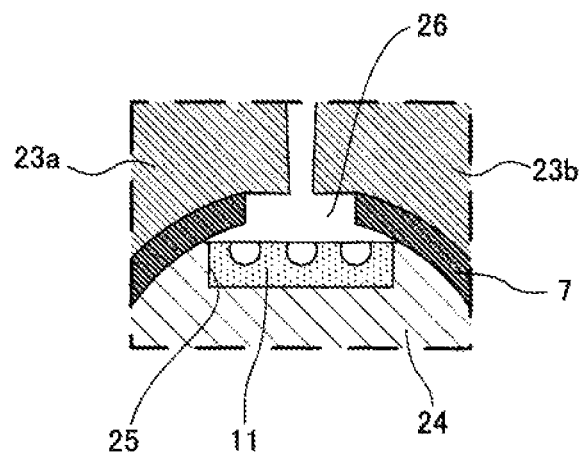
FIG. 9 is an enlarged view showing a gap for joining of slide cores.

Next, the slide cores 23a and 23b are closed to thereby bind an outer peripheral surface of the tubular shaped sheet 7 by the slide cores 23a and 23b. In an upper part of the closed slide cores 23a and 23b, a gap for joining 26, is formed along the slit 6 formed so that long edges face each other in the transverse direction of the tubular shaped sheet 7 as shown in FIG. 9. The gap for joining 26, of the slide cores 23a and 23b is covered with the first mold 21.

Accordingly, the gap for joining 26 is formed in a shape elongated in an axial direction by three surfaces of the slit matching surface of the tubular shaped sheer 7/the wiring unit 8 and the slide cores 23a and 23b.

Figure 10:
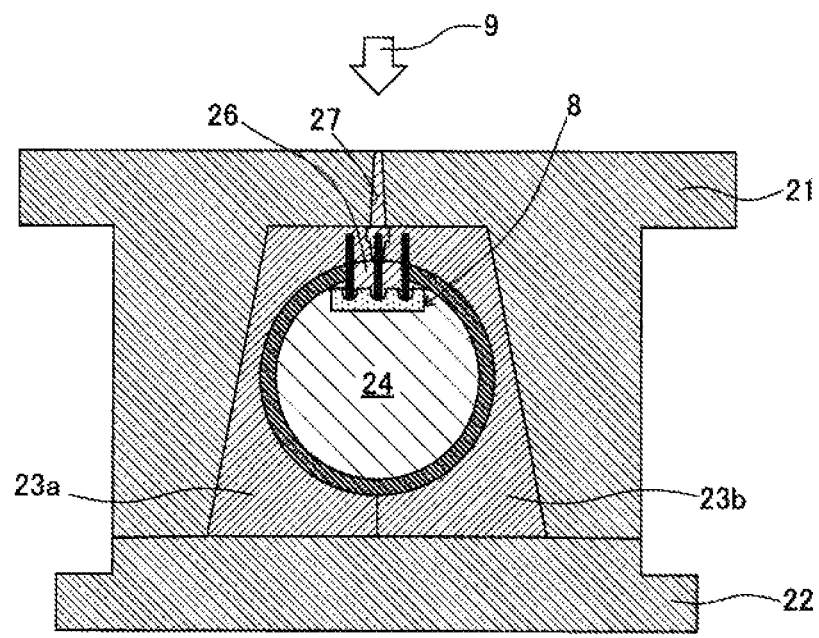
FIG. 10 is a view for explaining a state where molds are closed and a resin material is injected and filled.

As shown in FIG. 10, the molten resin material 9 is injected from a sprue 27 of the first mold 21 to the gap for joining 26 to be filled. As the resin material 9, a polyolefin-based thermoplastic joining resin is used. As the molten resin material 9 is injected into the gap for joining 26 and heat of the resin material 9 is dissipated, the resin material 9 is solidified, thereby performing joining in a shape elongated in the axial direction along the slit matching surfaces of the tubular shaped sheet 7 and integrating the wiring unit 8. Concerning both end surfaces of the tubular shaped sheet 7 in the axial direction wound around the core bar 24 in the tubular shape, the connecting parts 13 shown in FIG. 2A are integrally formed to thereby seal both end surfaces with the resin.

Figure 11:
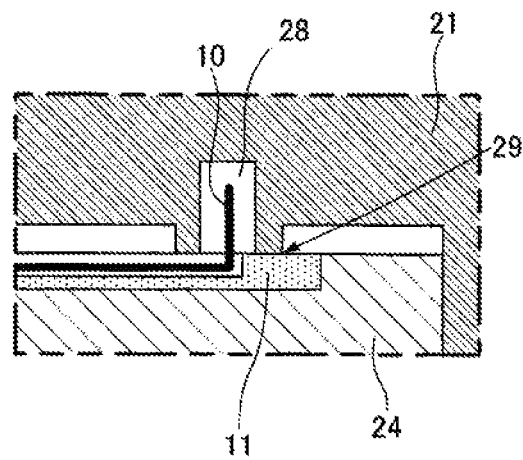
FIG. 11 is a structure view of molds showing a wiring escape space for covering a part where conductive wires of the wiring unit are drawn during molding.

The conductive wires 10 drawn out to the outside from the wiring unit 8 during the molding are housed in a wiring escape space 28 provided by the structure of the mold as shown in FIG. 11, and the mold contacts the holder 11 at an outer edge portion 29 of the wiring escape space 28 so that the molten resin material 9 does not flow into the wiring escape space 28.

Figure 12:
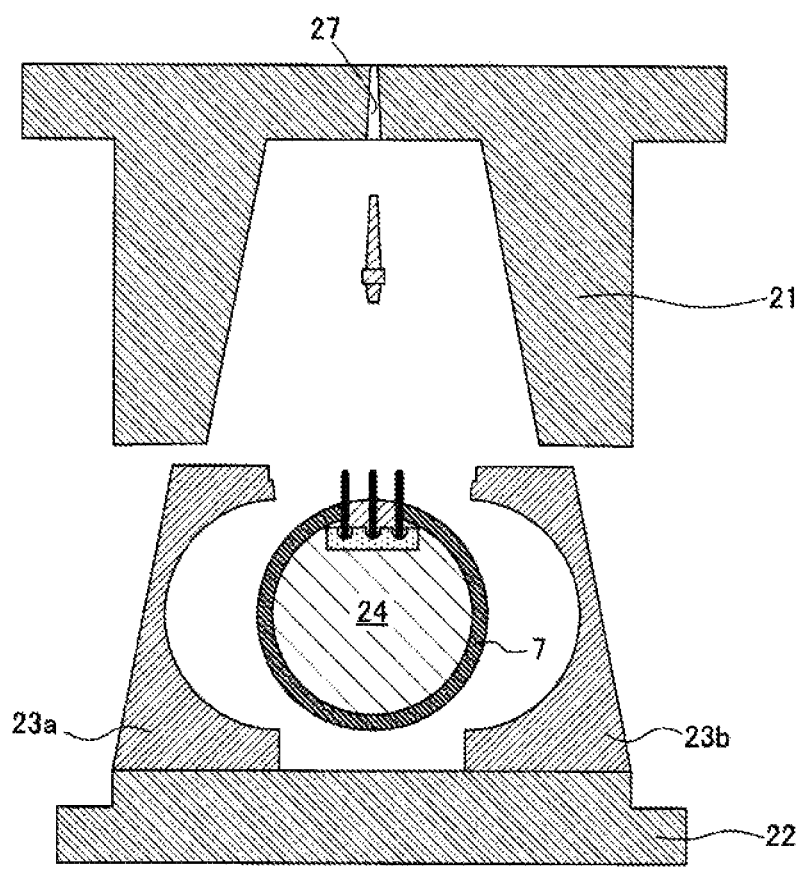
FIG. 12 is a view for explaining the mold opening state after the resin material is solidified.

After the resin material 9 is cooled and solidified, the molds are opened to release the slide cores 23a and 23b as shown in FIG. 12, and the core bar 24 is pulled out from a molded product as shown in FIG. 13 to thereby obtain the wiring incorporated resin pipe 4.

In the wiring incorporated resin pipe 4, the rectangular tubular shaped sheet 7 is wound around the core bar 24 to be bound so that a cross-sectional shape has the tubular shape, and further, the matching surface of the tubular shaped sheet 7 and the wiring unit 8 are joined and integrated by the cooled and solidified resin material 9.

When a diameter of the conductive wire 10 is "d", the necessary number of conductive wires 10 is "n", the buffer diameter "bd" is 0.2 mm or more, the holder 11 has a width of (d+bd)×n, respective conductive wires 10 are arranged at intervals whereby adjacent conductive wires 10 maintain insulation, a thickness is (d+bd), and an axial direction length in the longitudinal direction exceeds a wiring distance required for the conductive wires 10. A depth of the grooves 12 is d/2 or more and a shape of the holder 11 is a width 13 mm×a height 2 mm×and a length 344 mm, in which a distance between conductive wires is 3 mm, a conductive wire diameter d=1 mm and a depth of the grooves 12 is 0.8 mm.

According to the above structure, the product weight obtained at the time of manufacturing the wiring incorporated pipe was reduced by approximately 45% with respect to the weight of a pipe product obtained by a related-art manufacturing method in the same material, the same inner diameter and the same wiring distance. When a comparison was made in structures with the same inner diameter, an outer shape of the pipe obtained after the integration of wiring was reduced by approximately 9%.

Moreover, not only the slit matching surfaces of the tubular shaped sheet 7 in the axial direction but also both end surfaces of the tubular shaped sheet 7 are covered with the connecting parts 13 of the resin material 9 and sealed with resin, therefore, distortion and deformation from both ends of the tubular shaped sheet 7 having a cylindrical shape in cross section can be bound and the resin pipe with a high roundness can be manufactured.

The wiring incorporated thermoplastic resin pipe according to the present disclosure can incorporate wiring into the pipe in the same cycle time as the related-art injection molding, which can be applied to mass production of pipe members which require wiring.

A multilayer fiber reinforced resin sheet having a fabric layer is used for the tubular-shaped sheet 7, and a composition thereof is not particularly limited as long as a sheet material can be wound around the core bar 24 in a tubular shape. The sheet may also be a laminated sheet having plural layers or a prepreg containing a fiber layer formed of reinforced fiber, which is not particularly limited.

The tubular-shaped sheet 7, the holder 11 having the grooves 12 and the resin material 9 for joining are used as above, however, the combination is not particularly limited, and the pipe may be integrally manufactured by using a sheet, a holder and a joining resin with different kinds of systems, and the combinations thereof is not limited as long as they can be joined by injection molding.

The conductive wires 10 drawn out from the pipe are bent by 90 degrees, however, a drawing angle is not particularly limited and may be arbitrarily set.

Embodiment 2

FIG. 14A to FIG. 19 show Embodiment 2 of the present disclosure.

The holder 11 of the wiring unit 8 having the entire flat shape before being set in the core bar 24 as shown in FIG. 8A is used in Embodiment 1. Embodiment 2 differs from Embodiment 1 in one point in that the molding is performed in a state where the holder 11 which is bent in the longitudinal direction in the entire shape is set in the core bar 24. Explanation for the same components as those of Embodiment 1 is omitted while using the same symbols.

The holder 11 bent in the longitudinal direction was fabricated to have a shape obtained by adding a curvature radius 350 mm to the shape used in Embodiment 1 with the width 13 mm×the height 2 mm×the length 344 mm, in which the distance between conductive wires is 3 mm, the conductive wire diameter d=1 mm and the depth of the grooves 12 is 0.8 mm. The bent holder 11 is configured to have steps by forming convex parts 30 over the entire length of the holder 11 on both side surfaces as shown in FIG. 14B. On an inner surface of the concave part 25 of the core bar 24, convex parts 31 engaged with the convex parts 30 of the holder 11 set as shown in FIG. 15 are formed. The concave part 25 has a shape in which an upper surface is narrow and a lower surface is wide.

When the holder 11 of the wiring unit 8 is set in the core bar 24, upper surfaces of convex portions 30, 30 on one end of the holder 11 are engaged with lower surfaces of the convex parts 31, 31 of the core bar 24 and the bent holder 11 is set while being slid from one end of the core bar 24, thereby inserting the holder 11 by elastically deforming the shape of the holder 11 from the bent shape to a straight shape by the concave part 25 having a straight shape in cross section.

After the tubular-shaped sheet 7 is wound in an approximately tubular shape around the outer periphery of the core bar 24 in which the wiring unit 8 having the bent holder 11 as described above is set, an outer peripheral surface of the tubular-shaped sheet 7 is bound by the slide cores 23a and 23b in the same manner as Embodiment 1. Then, the molten resin material 9 is injected from the sprue 27 of the first mold 21 to fill the gap in the same manner as in Embodiment 1. After the filled resin material 9 is cooled and solidified, the core bar 24 is pulled out from a molded product.

In Embodiment 2, due to an effect of a restoring elastic force of the holder 11 to return to the original state by pulling out the core bar 24 from the molded product, an amount of warp to the inside of the pipe generated on the gap for joining 26 in the axial direction was reduced by 5% as compared with the case of Embodiment 1, and the wiring incorporated resin pipe 4 with a high cylindricity can be manufactured.

The details will be shown as follows.

In the case where the holder 11 is not bent, the entire joining resin is thermally contacted when the molten resin material 9 injected to the gap for joining 26 is changed into a cooled and solidified joining resin 9A.

Figure 17A:
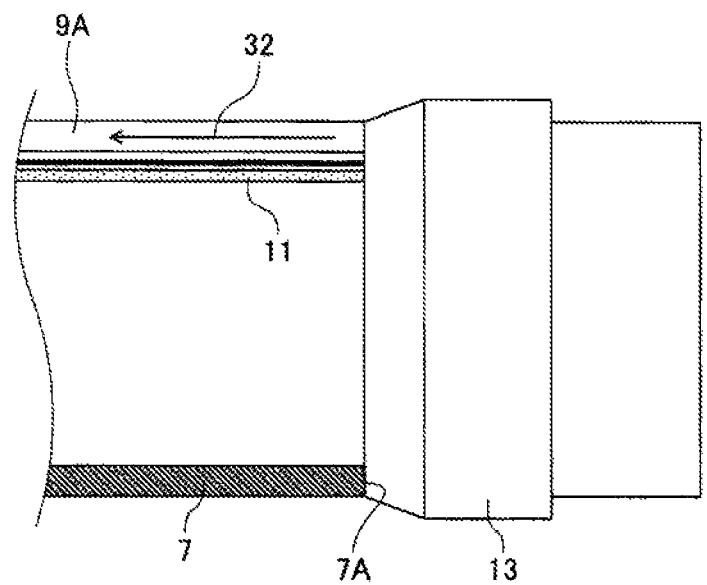
FIG. 17A is a view for explaining a contraction stress acting from both ends in an axial direction toward the center of the pipe.
Figure 17B:
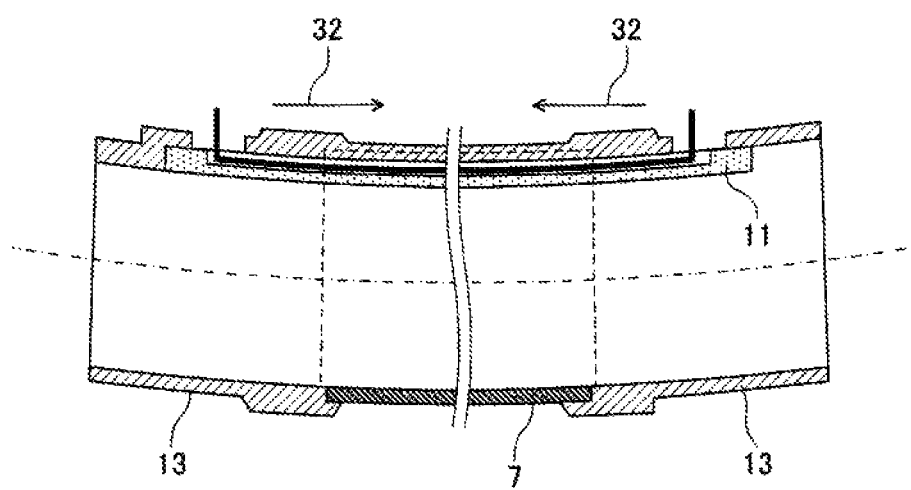
FIG. 17B is an entire view of FIG. 17A in a case where Embodiment 1 is used as a comparative example.

Both end surfaces 7A in the axial direction of the tubular-shaped sheet 7 wound in the tubular shape are bound and sealed by the cooled and solidified joining resin 9A, a contraction stress 32 is generated from both ends in the axial direction toward the center of the pipe as shown in FIG. 17A. However, the tubular shaped sheet 7 having the fiber layer formed of reinforced fiber is not melted, therefore, a state transition of cooling/solidification does not occur and the tubular shaped sheet 7 is not capable of following thermal contraction of the joining resin 9A. Accordingly, a warpage occurs in the molded product as shown in FIG. 17B on the gap for joining 26 provided on the slit matching surfaces of the tubular sheet 7 in a direction extending in the axial direction.

Figure 18A:
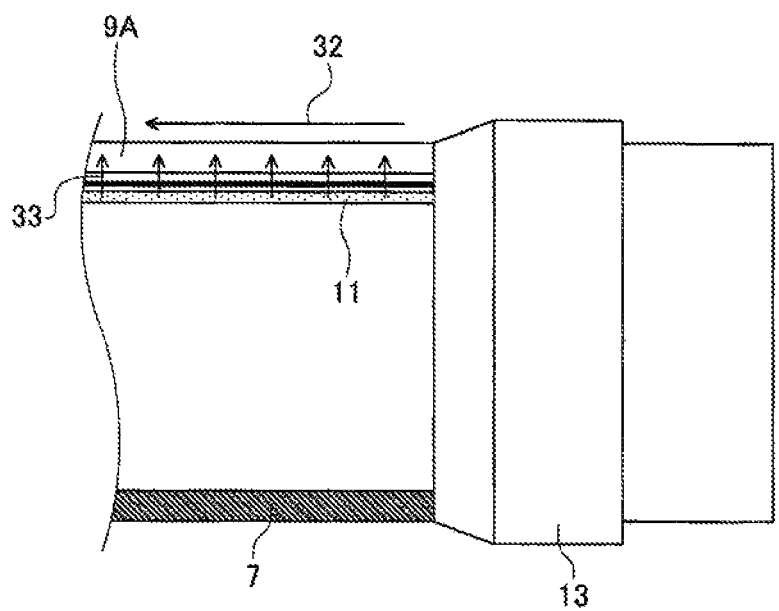
FIG. 18A is a view for explaining the contraction stress acting from both ends in the axial direction toward the center of the pipe and a restoring force acting from the holder and FIG. 18B is an entire view of FIG. 18A according to Embodiment 2 of the present disclosure.

On the other hand, the holder 11 itself is bent in Embodiment 2, therefore, a restoring force 33 of the holder 11 to return to the bent state as shown in FIG. 18A is generated in the molded product in the entire region elongated in the axial direction toward the joining resin 9A injected to the slit matching surfaces of the tubular shaped sheet 7 and cooled/solidified by opening the slide cores 23a and 23b and pulling out the core bar 24 after the molding.

Figure 18B:
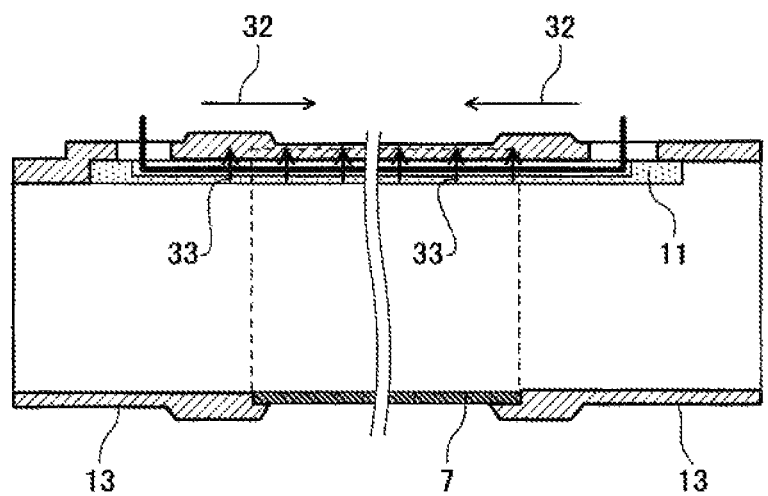

Accordingly, it is possible to repel the force to be warped to the inside on the gap for joining 26 from the inside as shown in FIG. 18B, which reduces the amount of warping of the wiring incorporated resin pipe 4 in the axial direction.

A curvature of the holder 11 can be set freely in a range in which a crack or a braking does not occur in the holder 11 when being slid and inserted into the concave part 25 of the core bar 24 to be straightened.

Figure 19:
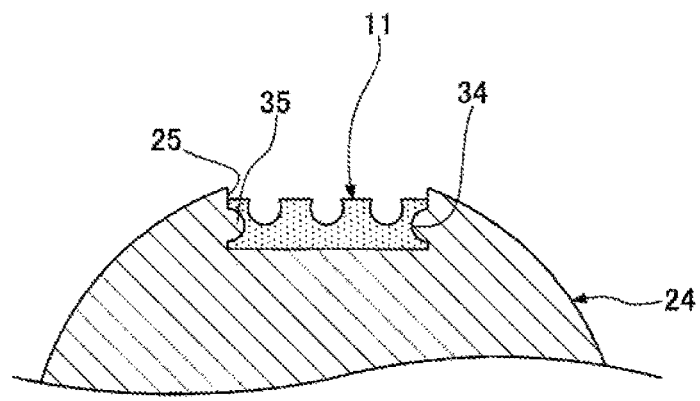
FIG. 19 is a cross-sectional view of a holder and a core bar used in the same embodiment as another example.

The structure of the holder 11 is not particularly limited as long as the holder 11 of the wiring unit 8 can be held in a flat state when inserted into the core bar 24 while being slid, and for example, a combination in which semicircular concave parts 34 are formed over the entire length of the holder 11 on both side surfaces of the bent holder 11 as shown in FIG. 19 and semicircular concave parts 35 to be engaged with the concave parts 34 are provided in the inside of the concave part 25 of the core bar 24 or the like can be adopted.

The bent holder 11 is engaged with the flat concave part 25 of the core bar 24 for holding the bent holder 11 in the flat state, however, even when the holder 11 itself is flat as in Embodiment 1, the holder 11 can be engaged with the flat concave part 25 of the core bar 24.

Embodiment 3

Figure 20A:
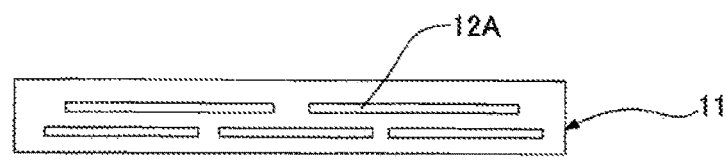
FIGS. 20A, 20B and 20C are plan views respectively showing different examples of the holder according to Embodiment 3 of the present disclosure.
Figure 20B:
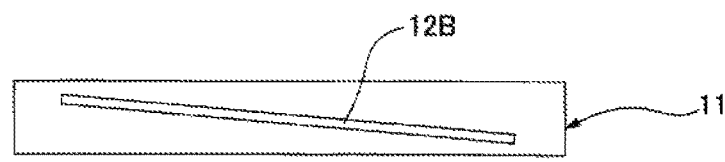
Figure 20C:
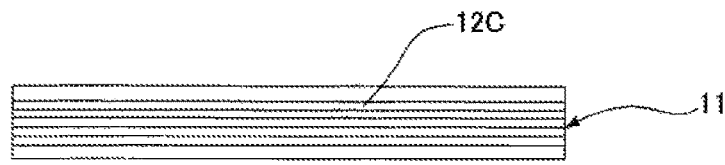

FIGS. 20A, 20B and 20C show Embodiment 3 of the present disclosure.

In the above respective embodiments, both ends of the conductive wires 10 are bent by 90 degrees and drawn out from peripheries of both ends of the wiring incorporated resin pipe 4, however, the drawing position of the pipe to the outside is not particularly limited. Specifically, the necessary number of grooves can be manufactured from arbitrary positions in various groove shapes as long as grooves do not interfere with the sheet or the joining resin in the structure such as a groove shape 12A in which a plurality of conductive wires 10 may be arranged on one straight line as shown in FIG. 20A, a groove shape 12B in which conductive wires 10 may be obliquely arranged as shown in FIG. 20B and a through-groove shape 12C in which the conductive wires 10 are buried in a straight manner without being bent at arbitrary positions and drawn out from end surfaces of the pipe in the axial direction as shown in FIG. 20C, and the conductive wires 10 passing from various positions through unconfined paths can be drawn to the outside of the pipe. The number of grooves determined by the number of conductive wires "n" is not limited. Such structures can be adopted to complicated routings of wiring or a case where positions from which conductive wires are desired to be drawn out differ according to conductive wires.

Embodiment 4

Figure 21A:
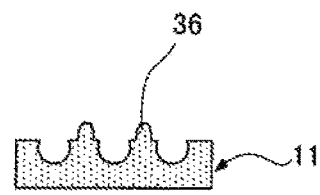
FIGS. 21A and 21B are cross-sectional views respectively showing different holders according to Embodiment 4 of the present disclosure.
Figure 21B:
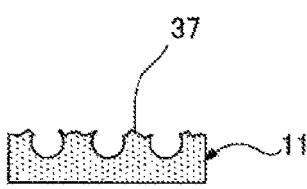

The holder 11 according to the above respective embodiments has the structure in which grooves into which the conductive wires 10 are inserted are just formed on a surface facing the gap for joining 26 and both sides of the groove are smooth flat surfaces. It is also preferable that protruding shapes 36 are provided at positions other than groove portions as shown in FIG. 21A and it is also preferable to adopt surfaces 37 in which surface properties on junction surfaces are intentionally roughed as shown in FIG. 21B.

According to the above structure, an anchor effect of the resin material 9 appears on the surface of the holder 11 by providing protrusions or by roughing the surface properties, as a result, joining strength is improved.

Embodiment 5

The holder 11 according to the above embodiments as the structure in which grooves 1, grooves 12A, 12B or 12C into which the conductive wires 10 are inserted are formed. It is also preferable that only both ends of the conductive wires 10 are drawn to the outside from the holder 11 formed of an electric insulating material so that the conductive wires 10 are buried in the electric insulating material except both ends as shown in FIGS. 22A and 22B.

Plural embodiments of the above respective embodiments may be combined at the same time.

The present disclosure contributes to greater manufacturing productivity of the wiring incorporated resin pipe used in various kinds of apparatuses.

What is claimed is:

1. A wiring incorporated resin pipe comprising:
a tubular shaped sheet formed in an approximately tubular shape at an interval so that a slit is formed between both ends in a transverse direction;
a wiring unit arranged in the tubular shaped sheet along a longitudinal direction of the slit in an inner side of the slit; and
a resin material filled in a gap formed by matching surfaces of the slit of the tubular shaped sheet and the wiring unit to thereby seal the matching surfaces of the slit of the tubular shaped sheet,
wherein conductive wires for wiring are laid inside the wiring unit in the longitudinal direction,
the wiring unit has a holder in which grooves into which conductive wires for wiring are inserted are formed, and
the resin material is filled in the grooves into which the conductive wires are inserted.

2. The wiring incorporated resin pipe according to claim 1,
wherein a cross section perpendicular to an axial direction of the wiring unit has steps or a concave-convex shape.

3. The wiring incorporated resin pipe according to claim 1,
wherein, when a diameter of each conductive wire is "d" and a necessary number of conductive wires is "n", a buffer diameter is "bd", a width of the holder is (d+bd)×n, and respective conductive wires are arranged at intervals whereby adjacent conductive wires maintain insulation, and
a thickness of the holder is (d+bd), a depth of the groove is d/2 or more and a length in an axial direction is a necessary wiring distance.

4. The wiring incorporated resin pipe according to claim 1, wherein the holder includes protruding portions at positions other than where the grooves are provided.

5. The wiring incorporated resin pipe according to claim 1, wherein the holder includes roughened surfaces at positions other than where the grooves are provided.

6. The wiring incorporated resin pipe according to claim 1, wherein the holder has a bent shape.

7. A vacuum cleaner comprising of:
a cleaner body provided with a motor which generates a vacuum force;
a flexible hose connected to the cleaner body; and
the wiring incorporated resin pipe of claim 1 connected to the flexible hose,
wherein the flexible hose and the wiring incorporated resin pipe transmit the vacuum force to a suction nozzle,
wherein a hand operation unit is arranged on the wiring incorporated resin pipe, and the wiring of the wiring incorporated resin pipe is connected to hand operation unit.

8. A method of manufacturing a wiring incorporated resin pipe comprising:
arranging a thermoplastic sheet having a rectangular shape to be in an approximately tubular shape at an interval so that a slit is formed between both ends in a transverse direction;
arranging a wiring unit in which conductive wires for wiring are laid in a longitudinal direction in the thermoplastic sheet in an inner side of the slit along the longitudinal direction of the slit, the conductive wires being inserted into grooves formed in a holder of the wiring unit; and
filling a resin material in a gap formed by matching surfaces of the slit of the thermoplastic sheet and the wiring unit to integrate the thermoplastic sheet with the wiring unit, and filling the resin material in the grooves into which the conductive wires are inserted.

9. A method of manufacturing a wiring incorporated resin pipe comprising:
arranging a thermoplastic sheet having a rectangular shape to be in an approximately tubular shape at an interval so that a slit is formed between both ends in a transverse direction on a peripheral surface of a core bar of a molding device, the molding device having a first mold, a second mold and the core bar arranged inside the second mold in a closed state of the first and second molds;
arranging a wiring unit in which conductive wires for wiring are laid in a longitudinal direction on the core bar in an inner side of the slit along the longitudinal direction of the slit;
injecting a molten resin material into a gap for joining formed by matching surfaces of the slit of the sheet arranged in the approximately tubular shape and the wiring unit after closing the first mold and the second mold; and
opening the molds after the resin material injected by injection is reduced in temperature and solidified and removing the core bar from a molded product in which the sheet and the wiring unit are integrated by the resin material,
wherein the wiring unit is arranged on the core bar by respectively arranging the conductive wires in plural grooves formed in a holder of the wiring unit.

10. The method of manufacturing the wiring incorporated resin pipe according to claim 9,
wherein the holder is bent in the longitudinal direction, and
the method further comprises setting the holder bent in the longitudinal direction on the core bar in a flat state.

11. The method of manufacturing the wiring incorporated resin pipe according to claim 10, further comprising:
forming cross sections perpendicular to an axial direction of the wiring unit and the core bar to have steps or a concave-convex shape engaged with each other.

12. The method of manufacturing the wiring incorporated resin pipe according to claim 9,
wherein, when a diameter of each conductive wire is "d", a necessary number of conductive wires is "n", a buffer diameter is "bd", a width of the holder is (d+bd)×n, and respective conductive wires are arranged at intervals whereby adjacent conductive wires maintain insulation, and
a thickness of the holder is (d+bd), a depth of the groove is d/2 or more and a length in an axial direction is a necessary wiring distance.

* * * * *